United States Patent [19]

Flack, Jr.

[11] 4,279,426

[45] Jul. 21, 1981

[54] SEAL FOR SPACE BETWEEN WINDOW OPENINGS OF A VEHICLE CAB AND A CAMPER CARRIED THEREBY

[76] Inventor: Earl Flack, Jr., P.O. Box 143, Arab, Ala. 35016

[21] Appl. No.: 125,547

[22] Filed: Feb. 28, 1980

[51] Int. Cl.³ .......................... F16J 15/02; B60P 3/32
[52] U.S. Cl. .................................. 277/237 R; 277/12; 296/166
[58] Field of Search .................... 277/12, 4, 101, 200, 277/237; 296/24 R, 99 R, 266; 280/762

[56] References Cited

U.S. PATENT DOCUMENTS

| | | | |
|---|---|---|---|
| 2,895,467 | 7/1959 | Wallin | 277/237 X |
| 3,625,560 | 12/1971 | Bjork | 296/166 |
| 3,844,603 | 10/1974 | Bjork et al. | 296/166 |
| 3,900,224 | 8/1975 | Copeland | 296/166 |

Primary Examiner—Robert S. Ward, Jr.
Attorney, Agent, or Firm—Woodford R. Thompson, Jr.

[57] ABSTRACT

The space between and surrounding aligned window openings of a vehicle cab and a camper carried thereby is sealed by an endless flexible member of sheet material of a length to surround the aligned window openings and of a width greater than the space therebetween. An endless resilient member is carried by the edge of each flexible member with each resilient member being of a length greater than the peripheral distance around the window opening adjacent thereto and adapted to snap therethrough and then retain a position outwardly thereof.

5 Claims, 5 Drawing Figures

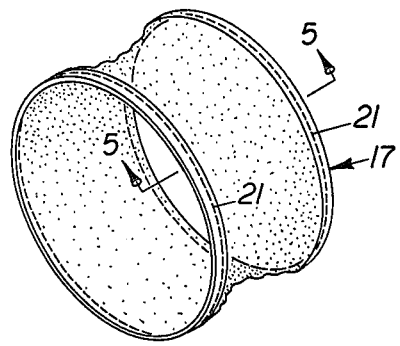
FIG_1
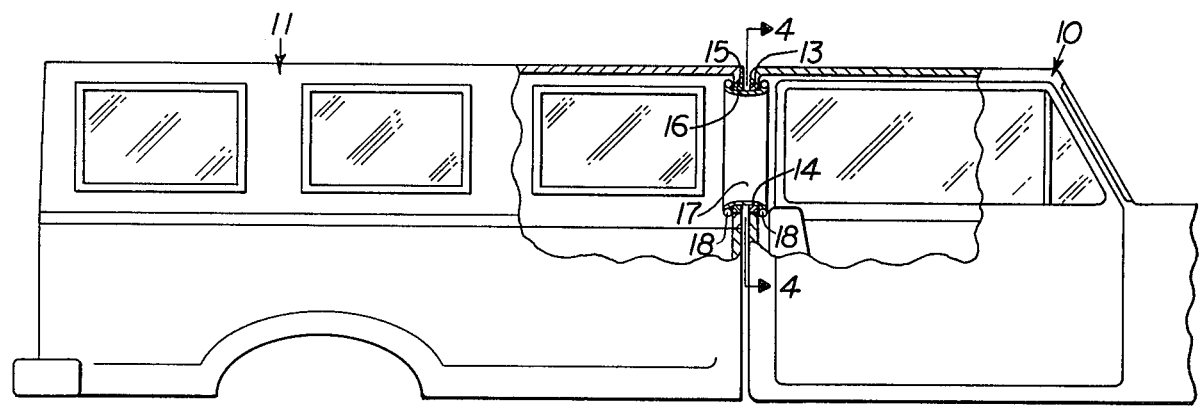
FIG_2
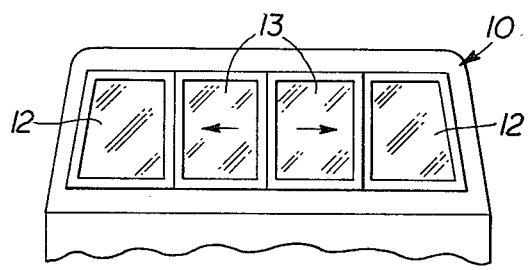
FIG_3
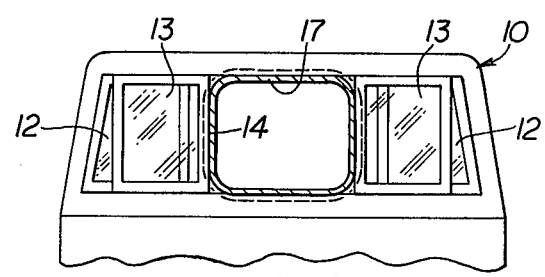
FIG_4
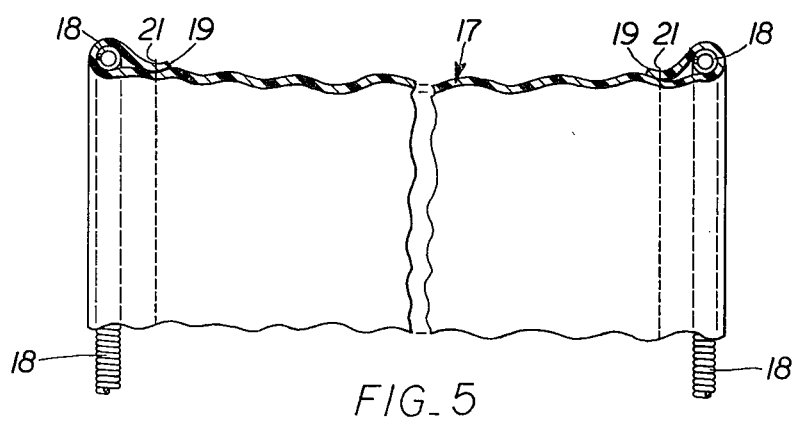
FIG_5

SEAL FOR SPACE BETWEEN WINDOW OPENINGS OF A VEHICLE CAB AND A CAMPER CARRIED THEREBY

BACKGROUND OF THE INVENTION

This invention relates to a seal device for sealing the space between and surrounding aligned, spaced apart window openings at the rear of a vehicle cab and a camper carried thereby and more particularly to such a seal device which may be inserted through the aligned window openings and then held in place by resilient means.

As is well known in the art to which my invention relates, it is desirable to communicate the interior of a vehicle cab and the interior of a camper carried thereby by providing a sealed passageway therebetween for circulating air from the air conditioning unit or heater unit carried by the vehicle. Also, such a passageway between the cab and the camper permits the occupants of the camper and the cab to communicate with each other.

Heretofore, difficulties have been encountered in sealing the space between and surrounding the aligned openings between the camper and the cab due to the fact that such space has usually been sealed by an inflatable boot which is positioned outwardly of the aligned openings and in position to surround the aligned openings. Such devices are expensive and very difficult to maintain in satisfactory working order. This is especially true in view of the fact that such inflatable members are easily punctured. Also, such inflatable members are usually blown up by manual means or by mouth since they are not of a sufficient strength to withstand higher pressures from hoses connected to compressors. Such inflatable devices also surround the entire window units at the forward end of the camper and at the rear of the vehicle cab rather than surrounding only the opening which communicates the cab with the camper. Furthermore, such inflatable boots remove paint from the adjacent surfaces of the camper and vehicle cab due to the fact that the cab and camper move relative to each to thus impart a rubbing action between the inflatable boot and the adjacent surfaces of the cab and camper.

SUMMARY OF THE INVENTION

In accordance with my invention, I overcome the above and other difficulties by sealing the space between and surrounding aligned window openings of a vehicle cab and a camper carried thereby by means of an endless, flexible member of sheet material of a length to surround the aligned window openings and of a width greater than the space therebetween. An endless, resilient member is carried by and extends along each edge of the endless flexible member with each of the resilient members being of a length greater than the peripheral distance around the window openings adjacent thereto and being adapted to snap through the adjacent window opening and then retain a position outwardly thereof. Accordingly, my improved device for sealing the space between and surrounding the aligned window openings of the vehicle cab and a camper carried thereby is adapted to fit window openings of various sizes and at the same time I eliminate the necessity of inserting inflatable members between the cab and the camper.

DESCRIPTION OF THE DRAWING

A device for sealing the space between and surrounding aligned window openings of a vehicle cab and a camper carried thereby is illustrated in the accompanying drawing, forming a part of this application, in which:

FIG. 1 is a perspective view showing the sealing device removed from the spaced apart window openings;

FIG. 2 is a side elevational view, partly broken away and in section, showing a vehicle cab and a camper carried thereby with my improved sealing device installed in the aligned window openings of the cab and camper;

FIG. 3 is a fragmental view showing the rear windows of the vehicle cab in closed position;

FIG. 4 is a fragmental view taken generally along the line 4—4 of FIG. 2 showing the rear windows of the vehicle cab moved to open position and showing my improved sealing device installed; and FIG. 5 is an enlarged, fragmental, sectional view taken generally along the line 5—5 of FIG. 1.

DETAILED DESCRIPTION

Referring now to the drawing for a better understanding of my invention, I show a vehicle cab 10 and a camper 11 carried thereby. The vehicle cab 10 is provided with the usual fixed windows 12 at opposite sides thereof and a pair of movable or slide-type windows 13 which are movable from the closed position shown in FIG. 3 to the open position shown in FIG. 4 to thus define a window opening 14 at the rear of the vehicle cab 10, as shown in FIGS. 2 and 4. The forward end of the camper 11 is provided with a window opening 16 which is in alignment with the window opening 14, as shown in FIG. 2.

To seal the space between and surrounding the aligned window openings 14 and 16 I provide an endless, flexible member 17 which is formed of a suitable impervious material, such as sheet plastic, or the like. The flexible member is also of a width greater than the space defined between the aligned window openings 14 and 16 so that it projects forwardly of the opening 14 at the rear of the cab 10 and rearwardly of the opening 16 at the front of the camper 11, as shown in FIG. 2.

An endless, resilient member 18 is carried by and extends along each edge of the endless flexible member 17, as shown in FIGS. 2 and 5. Each resilient member 18 is of a length greater than the peripheral distance around each of the aligned window openings 14 and 16 so that it is adapted to snap through its associated window opening 14 and 16, as the case may be, and then retain a position outwardly thereof, as shown in FIG. 2. The endless resilient member 18 may be in the form of a resilient metallic member, such as a conduit formed of a spiralled length of material, as shown in FIG. 5. That is, the endless resilient member 18 is formed of a material which may be flexed inwardly relative to its original position as it is snapped through an opening 14 and 16, whereupon it then moves outwardly toward its original position alongside the inner surface of the cab 10 or the camper 11, as the case may be.

As shown in FIGS. 1 and 5, each endless resilient member 18 may be secured in place by folding a portion 19 of the endless flexible member 17 along each edge thereof over the resilient member 18 adjacent thereto and then securing the portion 19 to the flexible member 17 by suitable means, such as by stitching at 21. However, it will be apparent to one skilled in the art that other suitable means may be employed for securing the folded over portion 19 to the flexible member 17, such as by heat sealing or by a suitable adhesive.

From the foregoing, the installation of my improved sealing device will be readily understood. The sliding windows 13 are moved from the position shown in FIG. 3 to the position shown in FIG. 4 to provide the opening 14 in the cab 10 while the window or windows 15 in the camper 11 are moved to an open position to provide the opening 16 which is in alignment with the opening 14 in the cab 10. The flexible member 17 is then snapped into its operating position, as shown in FIG. 2, by deflecting the endless resilient members 18 inwardly whereby they pass through the openings 14 and 16. The flexible member 17 is of a width greater than the space between the aligned window openings 14 and 16, and projects forwardly of the opening 14 and rearwardly of the opening 16, as shown in FIG. 2. After insertion of the flexible member 17 into the operating position shown in FIG. 2, the endless resilient members 18 then move outwardly toward their original position whereby they move outwardly of and alongside the adjacent inner surfaces of the cab 10 and camper 11, as the case may be. Accordingly, the sealing device is retained in position to effectively seal the space between and surrounding the aligned, spaced apart window openings 14 and 16.

From the foregoing, it will be seen that I have devised an improved seal device for sealing the space between and surrounding aligned window openings of a vehicle cab and camper carried thereby. By providing an endless flexible member of a length to surround both of the aligned window openings and of a width greater than the space therebetween, the device is adapted to fit various size openings and at the same time an effective seal is provided. Also, by providing an endless resilient member along each edge of the endless flexible member with each resilient member being of a length greater than the peripheral distance around the window opening adjacent thereto, the resilient member is adapted to snap through the window opening adjacent thereto and then retain a position outwardly of the window opening to thus secure the endless flexible member in place and at the same time provide a fluid tight joint between the endless flexible member and the adjacent portions of the windows 13 and 15.

While I have shown my invention in but one form, it will be obvious to those skilled in the art that it is not so limited, but is susceptible of various changes and modifications without departing from the spirit thereof.

What I claim is:

1. A sealing device for sealing the space between and surrounding aligned, spaced apart window openings at the rear of a vehicle cab and at the front of a camper carried thereby comprising:
    (a) an endless flexible member of sheet material of a length to surround both of said aligned window openings and of a width greater than the space therebetween so that it projects forwardly of the opening at the rear of the vehicle cab and rearwardly of the opening at the front of the camper, and
    (b) an endless resilient member carried by and extending along each edge of said endless flexible member with each said resilient member being of a length greater than the peripheral distance around the window opening adjacent thereto and being adapted to snap through said window opening adjacent thereto and then retain a position outwardly thereof.

2. A seal device as defined in claim 1 in which a portion of said endless flexible member along each edge thereof is folded over the resilient member adjacent thereto and is secured to said endless flexible member.

3. A seal device as defined in claim 2 in which said portion of the endless flexible member folded over the resilient member is secured to said endless flexible member by stitching.

4. A seal device as defined in claim 1 in which each said endless resilient member is a resilient metallic member.

5. A seal device as defined in claim 1 in which each said endless resilient member comprises a resilient conduit defined by a spiralled length of material.

* * * * *